United States Patent Office
3,272,796
Patented Sept. 13, 1966

3,272,796
SALT OF ALKALOID FROM *PHYLLANTHUS DISCODEUS*
Jean Louis Paul Mainil, Watermael-Boitsfort, Belgium, assignor to Société Anonyme Oletta, Luxembourg, Luxembourg
No Drawing. Filed Aug. 13, 1962, Ser. No. 216,316
Claims priority, application Belgium, Aug. 16, 1957, 442,303, Patent 560,107
1 Claim. (Cl. 260—236)

This application is a continuation-in-part of my earlier application Serial No. 755,152, filed August 15, 1958, now matured to U.S. 3,098,849.

My invention is concerned with novel pharmaceutical products, namely an alkaloid isolated from plants of the genus Phyllanthus (Euphorbiaceae), and more particularly from the species *Phyllanthus discodeus*, and acid addition salts of this alkaloid.

Investigations have shown that an alkaloid suitable for use in human and veterinary therapy by virtue of its diuretic, cardiotonic and respiratory analeptical activity can be obtained in an advantageous yield and in economic manner from species of the genus Phyllanthus.

This alkaloid takes the form of yellow crystals having a melting point of 136° C. Its empirical formula is $C_{13}H_{15}O_2N$. Its ultra-violet spectrum shows:

Max—255 m/$\mu$
300 m/$\mu$
Min—295 m/$\mu$

Logarithm $\epsilon$ at 255 m/$\mu$=4.19 for molecular weight 217. In mice, its toxicity is:

DL 50=95 mg./kg.

The salts of this alkaloid are white.

The alkaloid may be extracted from the plant or parts thereof by methods known to be capable of extracting alkaloids from vegetable matter. The term "known" as used in this context is understood as designating methods in actual use or described in the literature.

The features of such a process will be more clearly apparent from the example given below by way of non-limitative illustration:

The plants, or parts thereof, such as fruits, leaves, bark or roots (depending on the species and the season in which they are gathered) are crushed and rendered alkaline with a 20% ammonia solution, a 10% or 5% sodium carbonate solution, or milk of lime or magnesia, or are wetted with water.

In the case of *P. discodeus*, the extraction is effected from the roots.

After contact for several hours, the plant or part thereof is extracted in a Soxhlet type apparatus, a mixer, a percolator or a rotative extractor with for example ether, benzene or chloroform ethyl acetate or other solvent.

After complete extraction of the plant material with one or a mixture of these solvents, the extracts are in turn extracted with an aqueous solution of an organic or mineral acid or a mixture of such acids, at a concentration of from 2% to 20%.

The alkaloid passes into the acid solution. It is liberated by making this solution alkaline with ammonia or sodium carbonate solution. The alkaloid is then extracted with a solvent or a mixture of solvents immiscible with water, such as ether or chloroform. On distillation of the extract so obtained, a residue is obtained, which residue is dried and which consist of the alkaloid with other substances such as terepenic acids and resins.

These alkaloidal principles are dissolved and fixed on a chromatographic column of alumina, silica or an ion-exchange material. An eluent (benzene) then removes the alkaloid which, when taken up in methanol, crystallises in the form of beautiful yellow crystals. The recrystallisation may be repeated a number of times.

It is also possible to obtain crude alkaloidal residue by extraction of the plant with aqueous acid or neutral or acidified alcohol, concentration of the extract and extraction of the residue with a non-miscible solvent, in the alkaline phase.

The alkaloidal residue may be treated directly by successive recrystallisations from methanol until the pure product is obtained.

This alkaloid may be converted into mineral acid salts such as the sulphate, the hydrochloride or the nitrate (the latter being a stimulant for diuresis) or into organic acid salts, such as the tartrate, citrate, gluconate, camphorate or camposulphonate.

To form the camphosulphonate, a predetermined quantity of the basic alkaloid is dissolved in methanol and a solution of camposulphonic acid in methanol is added to give a pH of 5. Long white needles having a melting point of 152° C. are formed. It is also possible to proceed by double decomposition.

The base may also be employed as a starting product for the preparation of the camphosulphonate of ethylene diamine and of the alkaloid. For this purpose, a quantity of alkaloid base is weighed and dissolved in hot methanol, 25% of ethylene diamine is added, and the mixture is thereafter neutralised by the addition of camphosulphonic acid to a pH of 7.5 to 8. On concentration, a yellowish product crystallises out. On washing with ether, a slightly pink product having a melting point of 202° C. is obtained.

The product that is obtained, in its form, concentration and purity herein indicated does not exist in nature other than in combination with other substances such as terpenic acids and resins.

By treating a special raw material exemplified by the genus with disclosure of a particular species it has been possible to isolate a product having a particular combination of chemical and physical properties including the general formula, the color, the melting point, and most particularly the ultra-violet spectrum.

Moreover the pharmacodynamic study has given the following

I. ACTION ON THE CENTRAL AND PERIPHERAL NERVOUS SYSTEM

Phyllochrysine seems to exert an exciting effect on the central nervous system, and this is conformed by its waking action on a dormant animal (rabbit made dormant with urethane or a dog treated with chloralose).

It has been attempted to specify the place of action by trying to protect a mouse with barbiturate (thiopental) or with a medullary depressant (crezoxydiol).

*Phyllochrysine-thiopental*

Thiopental was administered intraperitoneally 15 minutes before the intravenous injection of 10 mg./kg. of phyllochrysine.

With the doses of 20 mg./kg., the thiopental protects the animals against the toxic action of the phyllochrysine; there were no deaths; only 50% of the animals show slight convulsive movements.

At the dose of 10 mg./kg., it still counteracts the lethality, but does not prevent convulsive phenomena.

II. ACTION ON THE RESPIRATION

In connection with a rabbit, the respiration of which was depressed by subcutaneous injection of 50 mg. of morphine hydrochloride, the dosage of 1 and 2 mg./kg., of phyllochrysine administered intravenously showed, after a latent period increasing with the dose, a very clear acceleration and increase in respiratory movements.

The product still exerts an action on the heart and on the muscles.

What I claim is:

The camposulphonate of ethylene diamine and of an alkaloid, said camposulphonate having a slight pink color and a melting point of 202° C., said alkaloid being prepared by a process comprising finely grinding a part of the *discodeus* species of the genus Phyllanthus (Euphorbiaceae), rendering said part alkaline, treating said part with an organic solvent selected from the group consisting of ether, benzene, chloroform and ethylacetate to derive an extract of active material, acidifying the extract with an aqueous solution of an acid at a concentration of from 2% to 20% whereby the alkaloid is caused to pass into the acid solution, adding a base to make the solution alkaline thereby forming a crude alkaloidal product, extracting the alkaloid with one of the group consisting of ether and chloroform, and distilling the extract to obtain a residue comprising the alkaloid and other substances, and separating the alkaloid by dissolution and chromatography, the said alkaloid having the following properties:

| | |
|---|---|
| Melting point | 136° C. |
| Empirical formular | $C_{13}H_{15}O_2N$ |
| Ultra-violet spectrum: | |
| Max. | 255 m$\mu$ |
| | 300 m$\mu$ |
| Min. | 295 m$\mu$ |

References Cited by the Examiner

UNITED STATES PATENTS

| | | | |
|---|---|---|---|
| 2,491,741 | 12/1949 | Ledrut | 260—236 |
| 2,509,051 | 5/1950 | Applezweig | 260—236 |
| 2,740,787 | 4/1956 | Mehltretter | 260—236 |
| 3,098,849 | 7/1963 | Mainil | 260—236 |

FOREIGN PATENTS 560,107    2/1958    Belgium.

OTHER REFERENCES

Degering: An Outline of Organic Nitrogen Compounds, University Lithoprinters, Ypsilanti, Mich. (1945), page 580.

Degering: An Outline of Organic Nitrogen Compound, University Lithoprinters, Ypsilanti, Mich. (1950), pp. 39 and 40.

Kirk et al. (ed.): Encyclopedia of Chem. Tech., vol. 1 (1948), pp. 507–515.

Mercier et al.: J. Pharm. Chem. (Ann. Pharm. Franc.) vol. I (1940), pp. 287–292.

Willaman et al.: Economic Botany, vol. 9, No. 2 (1955), page 144.

WALTER A. MODANCE, *Primary Examiner.*

NICHOLAS S. RIZZO, *Examiner.*

JAMES A. PATTEN, *Assistant Examiner.*